US012647818B2

(12) United States Patent
Dong

(10) Patent No.: US 12,647,818 B2
(45) Date of Patent: Jun. 2, 2026

(54) MULTI-LINK COMMUNICATION METHOD AND COMMUNICATION APPARATUS

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 323 days.

(21) Appl. No.: 18/565,483

(22) PCT Filed: May 31, 2021

(86) PCT No.: PCT/CN2021/097325
§ 371 (c)(1),
(2) Date: Nov. 29, 2023

(87) PCT Pub. No.: WO2022/252027
PCT Pub. Date: Dec. 8, 2022

(65) Prior Publication Data
US 2024/0298208 A1     Sep. 5, 2024

(51) Int. Cl.
*H04W 28/02*     (2009.01)
*H04L 1/16*     (2023.01)
(52) U.S. Cl.
CPC ........... *H04W 28/0263* (2013.01); *H04L 1/16* (2013.01)

(58) Field of Classification Search
CPC ................................. H04W 28/02; H04L 1/16
See application file for complete search history.

(56) References Cited

U.S. PATENT DOCUMENTS

| | | |
|---|---|---|
| 2019/0280819 A1 | 9/2019 | Määttanen et al. |
| 2020/0359259 A1 | 11/2020 | Patil et al. |
| 2021/0045008 A1 | 2/2021 | Bajko et al. |
| 2021/0112615 A1* | 4/2021 | Huang .................. H04L 1/1621 |
| 2021/0329500 A1* | 10/2021 | Cariou .................. H04W 28/24 |
| 2023/0199551 A1* | 6/2023 | Kim .................... H04W 28/082 370/229 |
| 2023/0308938 A1* | 9/2023 | Sun ................... H04W 28/0278 |

OTHER PUBLICATIONS

PCT/CN2021/097325, International Search Report dated Feb. 10, 2022, 3 pages.
European Patent Application No. 21943404.0, Search and Opinion dated Feb. 12, 2024, 10 pages.

* cited by examiner

*Primary Examiner* — Derrick V Rose
(74) *Attorney, Agent, or Firm* — Cozen O'Connor

(57) ABSTRACT

A communication method under multiple links. The communication method includes: performing monitoring under at least one link to which a traffic identifier (TID) is mapped in multiple links (210); and determining, according to a monitoring result, whether a data frame needs to be retransmitted (220).

15 Claims, 3 Drawing Sheets

AP MLD                    non-AP STA MLD

AP1    ←—— Link 1 ——→    STA1

AP2    ←—— Link 2 ——→    STA2

AP3    ←—— Link 3 ——→    STA3

AP MLD                    non-AP STA MLD

MULTI-LINK COMMUNICATION METHOD AND COMMUNICATION APPARATUS

CROSS-REFERENCE TO RELATED APPLICATION

This application is a U.S. national phase of International Application No. PCT/CN2021/097325, filed with the State Intellectual Property Office of P. R. China on May 31, 2021, the entire content of which is incorporated by reference for all purposes.

TECHNICAL FIELD

The disclosure relates to a wireless communication field, in particular to a communication method under multiple links and a communication apparatus under multiple links.

BACKGROUND

The current Wireless Fidelity (Wi-Fi) technology studies about bandwidth transmission of 320 MHz, aggregation and collaboration of multiple frequency bands and so on. A proposed vision aims to increase the rate and throughput by at least four times as compared to the existing standard. The main application scenarios include video transmission, Augmented Reality (AR), Virtual Reality (VR), or other situations.

The "aggregation and collaboration of multiple frequency bands" means that communications are performed among devices simultaneously in frequency bands of 2.4 GHz, 5 GHz, and 6 GHz. For communication performed among devices simultaneously in multiple frequency bands, a new Media Access Control (MAC) mechanism needs to be defined for management. In addition, low-latency transmission is expected to be supported by the aggregation and collaboration of multiple frequency bands.

SUMMARY

Aspects of the disclosure will at least solve the above problems and/or drawbacks. Embodiments of the disclosure provide the following technical solutions.

A communication method under multiple links is provided according to exemplary embodiments of the disclosure. The method is applicable to a station supporting multi-link communications. The method includes: performing monitoring under at least one link to which a traffic identifier (TID) is mapped in multiple links; and determining whether a data frame needs to be retransmitted based on a monitoring result.

A communication method under multiple links is provided according to exemplary embodiments of the disclosure. The method is applicable to an access point supporting multi-link communications. The method includes: determining a first message frame, in which the first message frame includes: identification information indicating that a data frame needs to be retransmitted and/or identification information of a link for retransmitting the data frame; and sending the first message frame under at least one link to which a TID is mapped in multiple links.

A communication apparatus under multiple links is provided according to exemplary embodiments of the disclosure. The apparatus is applicable to a station supporting multi-link communications. The apparatus includes: a transceiver module, configured to perform monitoring under at least one link to which a TID is mapped in multiple links;

and a processing module, configured to determine whether a data frame needs to be retransmitted based on a monitoring result.

A communication apparatus under multiple links is provided according to exemplary embodiments of the disclosure. The apparatus is applicable to an access point supporting multi-link communications. The apparatus includes: a processing module, configured to determine a first message frame, in which the first message frame includes: identification information indicating that a data frame needs to be retransmitted and/or identification information of a link for retransmitting the data frame; and a transceiver module, configured to send the first message frame under at least one link to which a TID is mapped in multiple links.

An electronic device is provided according to an exemplary embodiment of the disclosure. The electronic device includes a memory, a processor and a computer program stored on the memory and executable by the processor. When the computer program is executed by the processor, the above method is performed.

A computer-readable storage medium is provided according to an exemplary embodiment of the disclosure. The computer-readable storage medium has a computer program stored thereon. When the computer program is executed by a processor, the above method is performed.

The technical solutions according to exemplary embodiments of the disclosure enables data to be retransmitted on multiple links and improves spectrum utilization.

BRIEF DESCRIPTION OF THE DRAWINGS

The above and additional features of the embodiments of the disclosure will become more apparent by describing the embodiments of the disclosure in detail with reference to the accompanying drawings.

DETAILED DESCRIPTION

Figure 1:
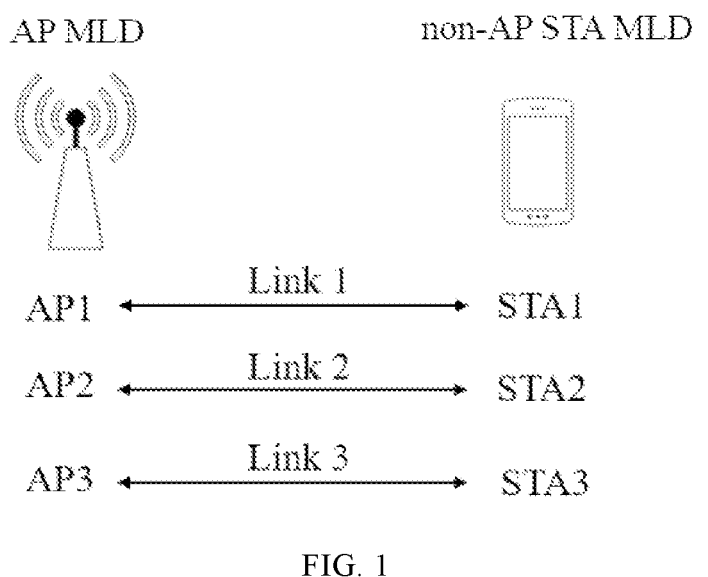
FIG. 1 is a schematic diagram illustrating a multi-link communication scenario.

The following description with reference to the accompanying drawings is provided to fully understand the various embodiments of the disclosure as defined by the appended claims and their equivalents. The various embodiments of the disclosure include various specific details, but such specific details are considered to be exemplary only. In addition, descriptions of well-known techniques, functions and constructions may be omitted for the sake of clarity and brevity.

Terms and words used in the disclosure are not limited to written meanings, but are used by inventors to enable a clear and consistent understanding of the disclosure. Therefore, for those skilled in the art, the description of various embodiments of the disclosure is provided only for the purpose of illustration, but not for the purpose of limitation.

It is understandable that "a", "an", "said", and "the" in singular forms used herein can also include plural forms, unless clearly indicated in the context otherwise. It should be further understood that the word "include" used in the disclosure refers to the existence of described features, integers, steps, operations, elements, and/or assemblies, but does not exclude the existence or addition of one or more other features, integers, steps, operations, elements, assemblies, and/or groups thereof.

It is understandable that although the terms "first" and "second" and the like can be used herein to describe various elements, these elements should not be limited by these terms. These terms are only used to distinguish one element from another. Therefore, a first element discussed below may be referred to as a second element without departing from the teaching of the embodiments.

It is understandable that when an element is referred to as being "connected" or "coupled" to another element, it may be directly connected or coupled to other elements, or intervening elements may also exist. In addition, as used herein, "connected" or "coupled" may include wireless connection or wireless coupling. The term "and/or" or the expression "at least one of . . . " used herein includes any and all combinations of one or more related listed items.

Unless otherwise defined, all terms used herein, including technical terms and scientific terms, have the same meaning as generally understood by those skilled in the art to which this disclosure belongs. In addition, the technical features involved in different embodiments of the disclosure described below can be combined with each other as long as they do not conflict with each other.

At present, the maximum bandwidth supported by the aggregation and collaboration of multiple frequency bands is 320 MHz (160 MHz+160 MHz). In addition, 240 MHz (160 MHz+80 MHz) and other bandwidths may also be supported.

An Access Point (AP) and a station (STA) in the related art may be multi-link devices (MLDs), i.e., supporting a function of simultaneously sending and/or receiving data under multiple links at a moment. Therefore, there may be multiple links between the AP and the STA, and communications between these two devices under the multiple links are studied.

FIG. 1 is a schematic diagram illustrating a multi-link communication scenario.

In a wireless local area network (LAN), a Basic Service Set (BSS) can include an access point (AP) and one or more stations (STAs) that communicate with the AP. One BSS can connect to a Distribution System (DS) through its AP, and then connect to another BSS, to form an Extended Service Set (ESS).

The AP is a wireless switch for the wireless network and is a core of the wireless network. The AP device can be used as a wireless base station and mainly used as a bridge to connect the wireless network and a wired network. With such AP, the wired and wireless networks can be integrated.

The AP may include software applications and/or circuitries to enable other types of nodes in the wireless network to communicate with outside and inside of the wireless network via the AP. For example, in some examples, the AP can be a terminal device or a network device equipped with a Wireless Fidelity (Wi-Fi) chip.

For example, the STA may include, but is not limited to: a cellular phone, a smart phone, a wearable device, a computer, a Personal Digital Assistant (PDA), a Personal Communication System (PCS) device, a Personal Information Manager (PIM), a Personal Navigation Device (PND), a global positioning system, a multimedia device, an Internet of Things (IoT) device, and others.

In an exemplary embodiment of the disclosure, the AP and the STA may each be a device supporting the multi-link, for example, denoted as AP MLD and non-AP STA MLD respectively. For ease of description, in the following, an example in which one AP communicates with one STA under multiple links (i.e., in the case of multiple links) is mainly described, which is not limited in the embodiments of the disclosure.

In FIG. 1, for example only, the AP MLD may represent an AP that supports a multi-link communication function, and the non-AP STA MLD may represent a STA that supports the multi-link communication function. As illustrated in FIG. 1, the AP MLD can work under three links, such as AP1, AP2, and AP3 as shown in FIG. 1. The non-AP STA MLD can also work under three links, such as STA1, STA2, and STA3 as shown in FIG. 1. In the example of FIG. 1, it is assumed that AP1 communicates with STA1 via a corresponding first link (i.e., Link 1). Similarly, AP2 communicates with STA2 via a second link (i.e., Link 2), and AP3 communicates with STA3 via a third link (i.e., Link 3). In addition, Link 1 to Link 3 may be links at different frequencies, for example, links at 2.4 GHz, 5 GHz, 6 GHz, etc., or links with the same or different bandwidths at 2.4 GHz, 5 GHz, and 6 GHz. In addition, multiple channels can exist under each link. However, it should be understood that the communication scenario shown in FIG. 1 is only exemplary, and the inventive concept is not limited thereto. For example, the AP MLD may be connected to multiple non-AP STA MLDs, or the AP can communicate with multiple other types of STAs under each link.

In an extreme high-throughput (EHT) communication, if one MLD has established a block acknowledgment protocol for a traffic identifier (TID) with another MLD, and a data frame of the TID (e.g., a Quality of Service (QoS) data frame) is not transmitted successfully under one link, and if the data frame is not a fragment, the MLD may try to retransmit the data frame on any link to which the TID is mapped.

The non-AP STA MLD in an enhanced-multilink single radio (EMLSR) mode can communicate with the AP MLD that supports the EMLSR mode. The EMLSR mode refers to that the non-AP STA MLD can only communicate with the AP MLD under one link at a certain moment, but can monitor channels under multiple links.

In detail, in the EMLSR mode, if the data frame needs to be retransmitted, the non-AP STA MLD first receives an initial control frame under one link and performs interaction of the data frame under the link, it cannot transmit or receive under other links before the interaction of data frames is completed. After the interaction of data frames is completed, the non-AP STA MLD can perform monitoring under all activated links. In addition, in an EHT communication, there is a mechanism for mapping the TID to the link, i.e., data with the same TID can be mapped to at least one link for transmission. In addition, data frames with the same TID can also be retransmitted under different links. However, in the related art, the non-AP STA MLD in the EMLSR mode needs to perform monitoring under all the activated links, but there may be a link to which no TID is mapped among all the activated links, which will reduce spectrum utilization and increase power consumption.

Figure 2:
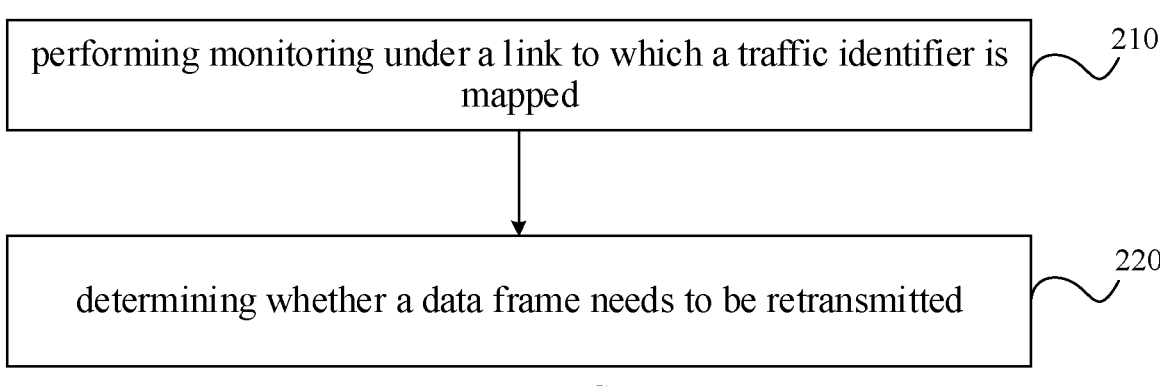
FIG. 2 is a flowchart illustrating a communication method according to an embodiment of the disclosure.

FIG. 2 is a flowchart illustrating a communication method according to an embodiment of the disclosure. The communication method shown in FIG. 2 can be applied to a station that supports multi-link communications (e.g., non-AP STA MLD).

Figure 3:
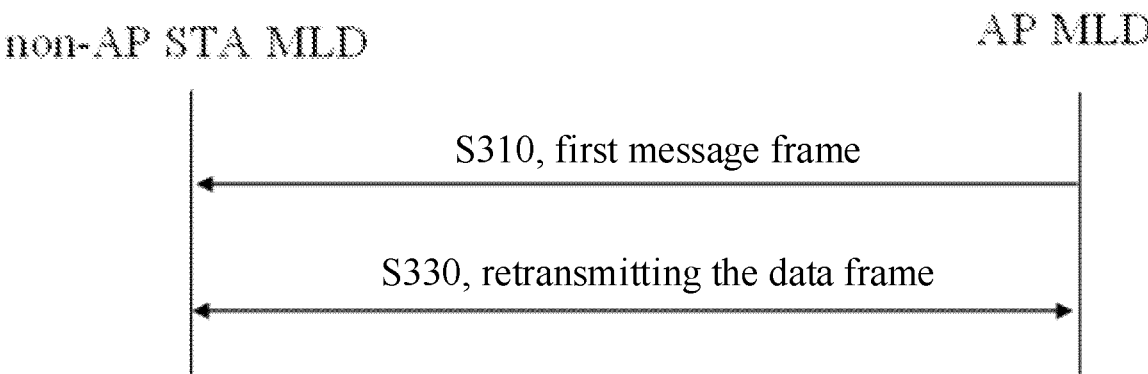
FIG. 3 is a detailed flowchart illustrating a communication method according to an embodiment of the disclosure.
Figure 4:
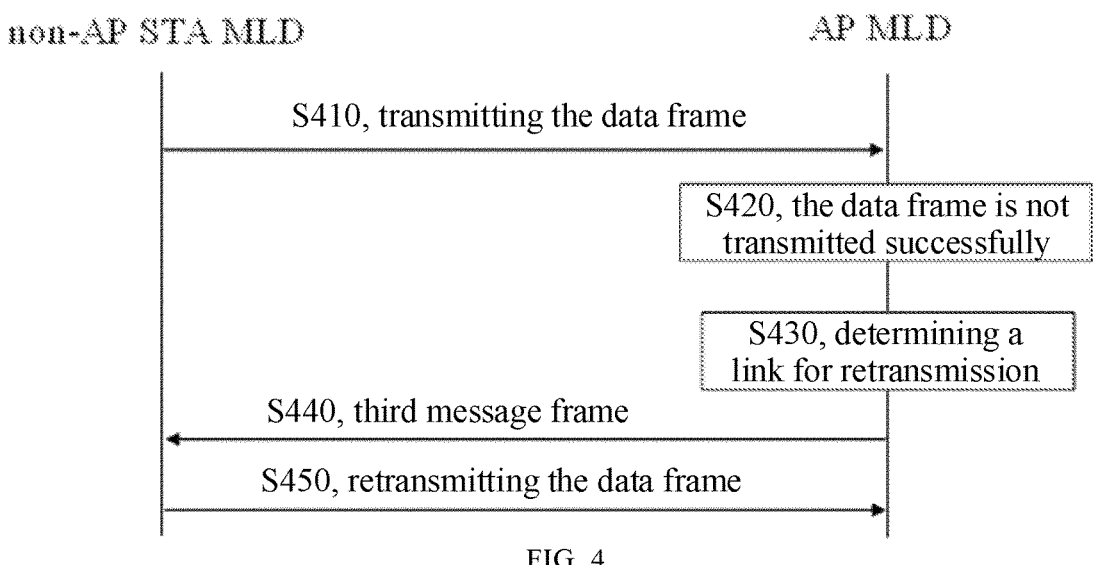
FIG. 4 is a detailed flowchart illustrating a communication method according to an embodiment of the disclosure.
Figure 5:
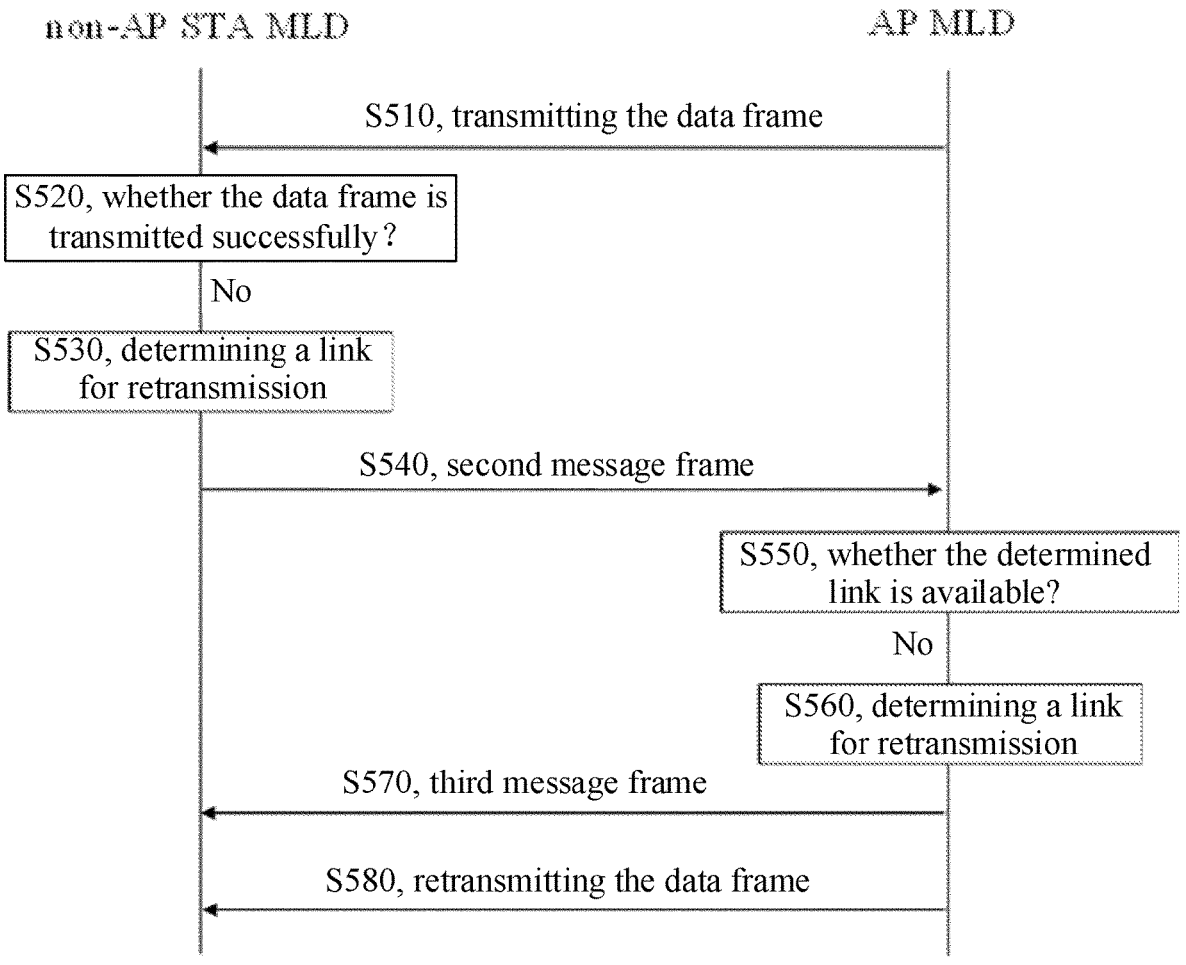
FIG. 5 is a detailed flowchart illustrating a communication method according to an embodiment of the disclosure.

As illustrated in FIG. 2, at block 210, monitoring is performed under at least one link to which a TID is mapped in multiple links. According to an exemplary embodiment, the multiple links may refer to all activated links, which may be multiple links initially established between the non-AP STA MLD and the AP MLD for communication. In the embodiment of the disclosure, monitoring is performed merely under at least one link to which the TID is mapped, rather than under all the activated links, to avoid wasting spectrum resources. According to the embodiment of the disclosure, the monitoring at block 210 may include, for example, monitoring a frame from the AP MLD for indicating that retransmission needs to be performed. As shown in FIG. 3, reception of a first message frame may be monitored. According to another embodiment of the disclosure, the monitoring at block 210 may include: monitoring an initial transmission situation of a data frame, e.g., as shown in FIGS. 4 and 5, monitoring whether the data frame is successfully transmitted under at least one link to which the TID is mapped.

At block 220, it is determined whether a data frame needs to be retransmitted based on a monitoring result. For example, it is determined that the data frame needs to be retransmitted when the monitored frame indicates that retransmission needs to be performed, or it is determined that the data frame needs to be retransmitted when it is monitored that the data frame is not transmitted successfully. During transmission of a downlink data frame, if the non-AP STA MLD receives information indicating that transmission of the data frame is failed, or if a feedback (e.g., an acknowledgement (ACK) frame) for the downlink data frame is not received before time expires, it is determined that the data frame is not transmitted successfully. During transmission of an uplink data frame, if the non-AP STA MLD is interrupted due to a communication failure while receiving the data frame, or if there is an error in the received data frame, or if the data frame is not received before time expires, it is determined that the data frame is not transmitted successfully. However, the examples of unsuccessful transmission of the downlink data frame and/or uplink data frame enumerated herein are illustrative only and are not limitations of the disclosure, and other methods, conditions, or factors capable of determining whether the data frame is transmitted successfully or not are included within the scope of the disclosure.

A communication method according to the embodiments of the disclosure will be described in detail below with reference to FIGS. 3-5.

With reference to FIG. 3, retransmission of a data frame can be realized by monitoring reception of a first message frame (a control frame from an AP MLD).

In detail, at block S310, a non-AP STA MLD monitors reception of the first message frame. For example, the non-AP STA MLD may monitor reception of the first message frame under at least one link to which the TID is mapped. For example, the first message frame may be an initial control frame sent by the AP MLD. According to the embodiment of the disclosure, the first message frame (e.g., the initial control frame) may include identification information indicating that the data frame needs to be retransmitted. The first message frame (e.g., the initial control frame) may include, but is not limited to, for example, a Retry subfield as the identification information. When the subfield is set to a specific value (for example, but is not limited to "1"), it indicates that retransmission of the data frame is required. According to the embodiment of the disclosure, the first message frame (e.g., the initial control frame) may also include communication information for transmitting the data frame, for example, but is not limited to, a number of spatial stream (NSS).

At block S330, in response to the first message frame being received, the non-AP STA MLD retransmits the data frame under a link on which the first message frame is received. Since the first message frame carries the identification information indicating that the data frame needs to be retransmitted, upon receiving the first message frame, the non-AP STA MLD may determine that retransmission of the data frame is required, in the embodiment, the non-AP STA MLD may retransmit the data frame under the link on which the first message frame (e.g., the initial control frame) is received. In addition, it is understood that the communication method shown in FIG. 3 may be applied to retransmission of both the uplink data frame and the downlink data frame.

According to the embodiments of the disclosure, the non-AP STA MLD that supports EMLSR can monitor the initial control frame sent by the AP MLD according to a situation of the link to which the TID is mapped. For example, if the non-AP STA MLD in the EMLSR mode supports multiple links, and there are multiple links in the activated state, but the TID is mapped to only one or some of the multiple links, the non-AP STA MLD in the EMLSR mode only needs to perform monitoring under the link to which the TID is mapped so as to receive the initial control frame sent by the AP MLD without monitoring the initial control frame under all the activated links, and then receives/sends the retransmitted data frame under the link on which the initial control frame is received. For example, the initial control frame can carry information such as NSS for transmitting the data frame, however, it should be understood that, the disclosure is not limited thereto. For example, in the case of monitoring the first message frame, the non-AP STA MLD may also negotiate with the AP MLD on other links for retransmitting the data frame.

In the embodiments of the disclosure, by retransmitting the data frame under the link on which the first message frame (e.g., the initial control frame) is received, retransmission can be achieved with simplified signaling interaction, e.g., without need to add additional signaling to negotiate the link for retransmitting the data frame.

As illustrated in FIG. 4, a data frame can be retransmitted by monitoring an initial transmission situation of the data frame. That is, by monitoring whether the data frame is successfully transmitted under at least one link to which the TID is mapped, it is determined whether the data frame needs to be retransmitted.

At block S410, a non-AP STA MLD can send a data frame to an AP MLD. The sending of the data frame at this step may refer to the initial transmission of the data frame. For example, according to the embodiments of the disclosure, the non-AP STA MLD may send the data frame under the corresponding link to which the TID is mapped.

In response to the data frame not being transmitted successfully (at block S420), the non-AP STA MLD may receive a third message frame from the AP MLD (at block S440). According to the embodiment of the disclosure, the non-AP STA MLD or the AP MLD may determine that the data frame is not transmitted successfully, and feed information (not shown) indicating that the data frame is not successfully transmitted back to the other party. According to the embodiment of the disclosure, the third message frame may include an information identifier of a link for retransmitting the data frame. The link for retransmitting the data frame is determined by an AP that supports multi-link communications (at S430). For example, according to the embodiment of the disclosure, the third message frame may be transmitted under any link to which the TID is mapped.

In the embodiment of the disclosure, the third message frame may be a feedback frame for the data frame sent by the non-AP STA MLD, for example, an ACK frame. The third message frame (e.g., the ACK frame) may carry identification information of the link determined by the AP MLD for retransmitting the data frame, but the disclosure is not limited thereto. The third message frame maybe any type of frame.

According to the embodiment of the disclosure, the identification information of the link for retransmitting the data frame may be carried in the form of a link set. For example, the link set may include multiple bits (for example, the number of bits in the link set may be determined according to a situation of mapping the TID to the link), and the bit corresponding to the link for retransmitting the data frame may be set to a specific value (for example, but is not limited to, "1"). According to another embodiment of the disclosure, the identification information of the link for retransmitting the data frame may be carried in the form of a separate link ID. For example, the link ID may refer to combination information of an operating spectrum, a bandwidth/channel, a basis service set identifier (BSSID), etc.

According to the embodiment of the disclosure, the AP MLD can determine the link for retransmitting the data frame according to various information (for example, but is not limited to, a situation of mapping the TID to the link, load information of the link, status information, bandwidth information, network condition, hardware capabilities, service types, and related protocol regulations, etc.).

At block S440, the non-AP STA MLD may learn/determine the link for retransmitting the data frame through the identification information of the link carried in the third message frame, and retransmit the data under the link.

Although the communication method shown in FIG. 4 is described by taking the transmission of an uplink data frame as an example, the disclosure is not limited thereto, and the communication method shown in FIG. 4 can also be applied to the transmission of a downlink data frame.

According to the embodiment of the disclosure, the non-AP STA MLD in the EMLSR mode and the AP MLD can determine the link for retransmission after the initial interaction of the data frame is completed. In detail, the link for retransmission can be determined in the feedback ACK frame. For example, the determined link can be a link set (according to the situation of mapping the TID to link). For example, the corresponding bit is set to 1. Or the determined link can be in the form of a link ID, to identify the determined link on which the retransmitted data frame is received/sent.

According to the embodiment of the disclosure, by additionally determining the link for retransmitting the data frame, multiple links can be effectively utilized for retransmission, thereby improving the adaptability of the device.

With reference to FIG. 5, an embodiment of negotiating a link for retransmitting a data frame between a non-AP STA MLD and an AP MLD is shown. Although the communication method shown in FIG. 5 is described by taking the transmission of a downlink data frame as an example, the disclosure is not limited thereto, and the communication method shown in FIG. 5 can also be applied to the transmission of an uplink data frame.

At block S510, the non-AP STA MLD may receive a data frame sent by the AP MLD under a corresponding link to which a TID is mapped. If the non-AP STA MLD is interrupted due to a communication failure while receiving the data frame, or if there is an error in the received data frame, or if the data frame is not received before time expires, it is determined that the data frame is not transmitted successfully (at S520).

At block S530, in response to the data frame not being transmitted successfully, the non-AP STA MLD may determine a link for retransmitting the data frame. According to the embodiment of the disclosure, in a process of establishing an initial association link with the AP MLD or in a process of establishing multiple links, the non-AP STA MLD may obtain information about each link from the AP MLD (for example, but is not limited to, a situation of mapping the TID to the link, load information of the link, status information, bandwidth information, network condition, hardware capabilities, service types, and related protocol regulations, etc.). At block S530, the non-AP STA MLD can determine the link for retransmitting the data frame according to the obtained information.

At block S540, the non-AP STA MLD may send a second message frame, in which the second message frame may include identification information of the determined link, for example, identification information in the form of a link set or link ID as described with reference to FIG. 4. According to the embodiment of the disclosure, the non-AP STA MLD may send the second message frame under any link to which the TID is mapped.

At block S550, the AP MLD may parse the second message frame and obtain the link for retransmission determined by the non-AP STA MLD, to determine whether the link is available. If the AP MLD determines that the link determined by the non-AP STA MLD is not available for retransmission according to the current communication condition (for example, but is not limited to, a situation of mapping the TID to the link, load information of the link, status information, bandwidth information, network condition, hardware capabilities, service types, and related protocol regulations, etc.), the AP MLD may determine/recommend a link that can be used for retransmission (at block S560) and carry information about the recommended link in a third message frame to send/feedback the information about the recommended link to the non-AP STA MLD (at block S570). In this case, the non-AP STA MLD may utilize the link recommended by the AP MLD for retransmitting the data frame.

If at block S550, the AP MLD determines that the link for retransmission determined by the non-AP STA MLD is available, blocks S560 and S570 may be omitted.

According to the embodiment of the disclosure, by negotiating the link for retransmitting the data frame between the non-AP STA MLD and the AP MLD, the flexibility of the device can be improved, thereby effectively retransmitting the data frame.

Figure 6:
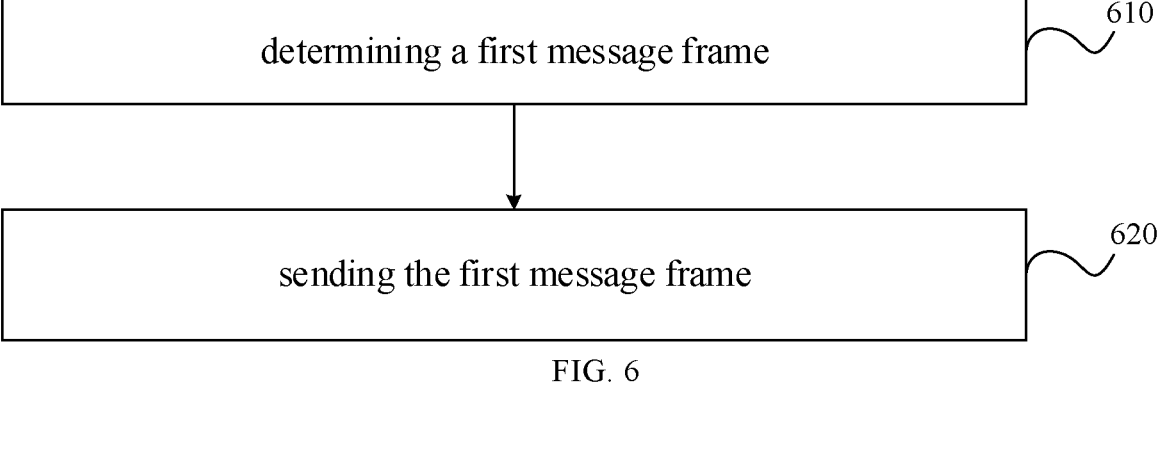
FIG. 6 is a flowchart illustrating another communication method according to an embodiment of the disclosure.

FIG. 6 is a flowchart illustrating another communication method according to an embodiment of the disclosure. The communication method shown in FIG. 6 can be applied to an AP that supports multi-link communications.

With reference to FIG. 6, at block 610, a first message frame may be determined, in which the first message frame may include: identification information indicating that a data frame needs to be retransmitted and/or identification information of a link for retransmitting the data frame. At block 620, the first message frame may be sent under at least one link to which a TID is mapped in multiple links.

In the case where the first message frame includes the identification information indicating that the data frame needs to be retransmitted, the first message frame may include, for example, but is not limited to, an initial control frame. In this case, the first message frame may also include: communication information for transmitting the data frame. In addition, the data frame may be retransmitted under the link on which the first message frame is sent (e.g., the retransmitted data frame is received/sent under the link on which the initial control frame is sent). That is, the method shown in FIG. 6 may correspond to the operations performed by the AP MLD in FIG. 3. For simplicity, repeated descriptions are omitted here.

In the case where the first message frame includes the identification information indicating that the data frame needs to be retransmitted, the first message frame may correspond to the third message frame described with reference to FIGS. 4 and 5. That is, the method shown in FIG. 6 may correspond to the operations performed by the AP MLD in FIGS. 4 and 5. For simplicity, repeated descriptions are omitted here.

In an embodiment, as shown in block S540 of FIG. 5, in response to the initial transmission of the data frame being unsuccessful, the AP MLD may receive the second message frame, in which the second message frame includes identification information (a link set or a link ID) of the link for retransmitting the data frame. The link for retransmitting the data frame is determined by an STA (the non-AP STA MLD) that supports multi-link communications.

In another embodiment, as shown in blocks S430 and S440 of FIG. 4 and blocks S560 and S570 of FIG. 5, the AP MLD may determine the link for retransmitting the data frame, carry its identification information in the third message frame, and send the third message frame to the non-AP STA MLD.

Although in the above embodiments, the identification information indicating that the data frame needs to be retransmitted and the identification information of the link for retransmitting the data frame are carried in different frames respectively, the disclosure is not limited thereto, and the two pieces of identification information can be carried in a same message frame. That is, the link for retransmission can be determined while indicating that the data frame needs to be retransmitted.

Figure 7:
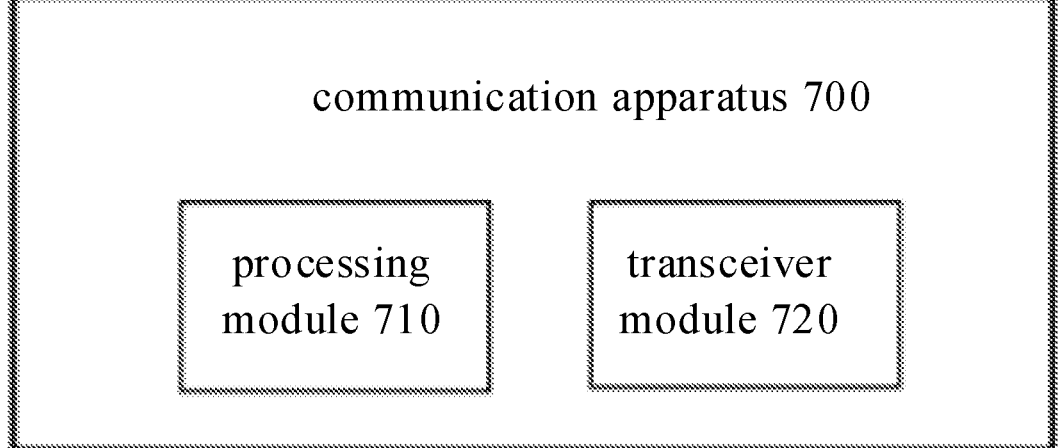
FIG. 7 is a block diagram of a communication apparatus according to an embodiment of the disclosure.

FIG. 7 is a block diagram of a communication apparatus according to an embodiment of the disclosure.

With reference to FIG. 7, the communication apparatus 700 may include a processing module 710 and a transceiver module 720. The communication apparatus shown in FIG. 7 can be applied to a non-AP STA MLD or an AP MLD.

In the case where the communication apparatus shown in FIG. 7 is applied to the non-AP STA MLD, the transceiver module 720 can be configured to: perform monitoring under at least one link to which a TID is mapped in multiple links. The processing module 710 can be configured to determine whether a data frame needs to be retransmitted based on a monitoring result. In this case, the communication apparatus 700 may perform the communication method described with reference to FIG. 2 and the operations performed by the non-AP STA MLD described in FIGS. 3 to 5. For simplicity, repeated descriptions are omitted here.

In the case where the communication apparatus shown in FIG. 7 is applied to the AP MLD, the processing module 710 can be configured to determine a first message frame, in which the first message frame includes: identification information indicating that a data frame needs to be retransmitted and/or identification information of a link for retransmitting the data frame. The transceiver module 720 can be configured to send the first message frame under at least one link to which a TID is mapped in multiple links. In this case, the communication apparatus 700 may perform the communication method described with reference to FIG. 6 and the operations performed by the AP MLD described in FIGS. 3 to 5. For simplicity, repeated descriptions are omitted here.

In addition, the communication apparatus 700 illustrated in FIG. 7 is only an example and is not used to limit embodiments of the disclosure. For example, the communication apparatus 700 may also include other modules, e.g., a memory module. In addition, respective modules in the communication apparatus 700 may be integrated into a more complex module or may be divided into more separate modules.

The communication methods and communication apparatuses according to the embodiments of the disclosure enable data to be retransmitted under multiple links and improve spectrum utilization.

Based on the same principles as the method provided in the embodiments of the disclosure, the embodiments of the disclosure also provide an electronic device including a processor and a memory. The memory stores machine-readable instructions (which may also be referred to as "computer programs"), and the processor is configured to execute the machine-readable instructions, to implement the method described with reference to FIGS. 2 to 6.

The embodiments of the disclosure also provide a computer-readable storage medium having computer programs stored thereon. When the computer programs are executed by a processor, the method described with reference to FIGS. 2 to 6 is implemented.

In the exemplary embodiments, the processor may be a logic box, a module, or a circuit, for implementing or executing various embodiments described in the disclosure, for example, a Central Processing Unit (CPU), a general processor, a Digital Signal Processor (DSP), an Application Specific Integrated Circuit (ASIC), a Field Programmable Gate Array (FPGA) or other programmable logic devices, a transistor logic device, a hardware component, or any combination thereof. The processor may also be a combination used to implement a computing function, for example, a combination consisting of one or more microprocessors, and a combination consisting of DSPs and microprocessors.

In the exemplary embodiments, the memory may be, for example, a Read Only Memory (ROM), a Random Access Memory (RAM), an Electrically Erasable Programmable Read Only Memory (EEPROM), a Compact Disc Read Only Memory (CD-ROM) or other optical disc memories, optical disk memories (including compact disc, laser disc, CD-ROM, digital general disc, and Blu-ray disc), disk storage mediums or other magnetic storage devices, or any other medium that can be used to carry or store program codes in the form of instructions or data structures and can be accessed by a computer, which is not limited herein.

It should be understood that although steps in the flowchart of the accompanying drawings are shown sequentially as indicated by the arrows, the steps are not necessarily performed sequentially in the order indicated by the arrows. Unless explicitly stated otherwise in the disclosure, there is no strict sequential limitation on the execution of these steps, which may be performed in any other order. In addition, at least some of the steps in the flowchart of the accompanying drawings may include a plurality of sub-steps or a plurality of phases, which are not necessarily executed at the same time, but may be executed at different times. The execution order is not necessarily sequential, and the steps can be performed alternately or alternatively with other steps or at least part of sub-steps or phases of other steps.

Although the disclosure has been shown and described with reference to the embodiments of the disclosure, it will be understood by those skilled in the art that various changes in form and detail can be made without departing from the scope of the disclosure. Accordingly, the scope of the disclosure should not be limited by the embodiments, but should be defined by the appended claims and their equivalents.

The invention claimed is:

1. A communication method under multiple links, performed by a station supporting multi-link communications, comprising:

performing monitoring under at least one link to which a traffic identifier (TID) is mapped in multiple links; and determining whether a data frame needs to be retransmitted based on a monitoring result;

wherein performing the monitoring under the at least one link comprises: monitoring whether the data frame is transmitted successfully under the at least one link;

the method further comprising:

determining a link for retransmitting the data frame, in response to a scenario that the data frame is not transmitted successfully; and sending a second message frame, wherein the second message frame comprises identification information of the determined link.

2. The method of claim 1, wherein performing the monitoring under the at least one link comprises: monitoring reception of a first message frame, wherein the first message frame comprises identification information indicating that the data frame needs to be retransmitted.

3. The method of claim 2, further comprising:

receiving the first message frame; and retransmitting the data frame under a link on which the first message frame is received.

4. The method of claim 2, wherein the first message frame further comprises: communication information for transmitting the data frame.

5. The method of claim 1, further comprising:

receiving a third message frame, in response to a scenario that the data frame is not transmitted successfully, wherein:

the third message frame comprises an information identifier of a link for retransmitting the data frame, and the link for retransmitting the data frame is determined by an access point supporting multi-link communications.

6. A communication method under multiple links, performed by an access point supporting multi-link communications, comprising:

determining a first message frame, wherein the first message frame comprises at least one of: identification information indicating that a data frame needs to be retransmitted or identification information of a link for retransmitting the data frame; and sending the first message frame under at least one link to which a traffic identifier (TID) is mapped in multiple links;

wherein the method further comprises:

receiving a second message frame, wherein the second message frame comprises identification information of the link for retransmitting the data frame, and the link for retransmitting the data frame is determined by a station supporting multi-link communications.

7. The method of claim 6, further comprising:

retransmitting the data frame under a link on which the first message frame is sent.

8. The method of claim 6, wherein the first message frame further comprises: communication information for transmitting the data frame.

9. The method of claim 6, further comprising: determining the link for retransmitting the data frame.

10. The method of claim 9, further comprising:

sending a third message frame, wherein the third message frame comprises identification information for identifying the determined link.

11. A station comprising a memory, a processor and a computer program stored on the memory and executable by the processor, wherein when the computer program is executed by the processor, the processor is caused to perform:

performing monitoring under at least one link to which a traffic identifier (TID) is mapped in multiple links; and determining whether a data frame needs to be retransmitted based on a monitoring result;

wherein performing the monitoring under the at least one link comprises: monitoring whether the data frame is transmitted successfully under the at least one link;

the processor is further caused to perform:

determining a link for retransmitting the data frame, in response to a scenario that the data frame is not transmitted successfully; and sending a second message frame, wherein the second message frame comprises identification information of the determined link.

12. The station of claim 11, wherein performing the monitoring under the at least one link comprises: monitoring reception of a first message frame, wherein the first message frame comprises identification information indicating that the data frame needs to be retransmitted.

13. The station of claim 12, wherein the processor is further caused to perform:

receiving the first message frame; and retransmitting the data frame under a link on which the first message frame is received.

14. The station of claim 12, wherein the first message frame further comprises: communication information for transmitting the data frame.

15. The station of claim 11, wherein the processor is further caused to perform:

receiving a third message frame, in response to a scenario that the data frame is not transmitted successfully; wherein the third message frame comprises an information identifier of a link for retransmitting the data frame, and the link for retransmitting the data frame is determined by an access point supporting multi-link communications.

* * * * *